United States Patent
Stimpson et al.

(10) Patent No.: US 7,312,433 B2
(45) Date of Patent: Dec. 25, 2007

(54) MEASURING DEVICE AND METHOD FOR DETECTING OBJECTS INTERRUPTING A BEAM OF RADIATION

(75) Inventors: Victor G. Stimpson, Avening (GB); Benjamin J. Merrifield, Bristol (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/902,307

(22) Filed: Jul. 30, 2004

(65) Prior Publication Data

US 2005/0024650 A1 Feb. 3, 2005

(30) Foreign Application Priority Data

Aug. 1, 2003 (GB) .................. 0317961.1

(51) Int. Cl.
*G01N 21/86* (2006.01)
*B23B 39/00* (2006.01)
*B23B 49/00* (2006.01)
*G01B 11/14* (2006.01)
*G06M 7/00* (2006.01)

(52) U.S. Cl. .............. 250/221; 250/559.4; 250/559.12; 408/6; 408/16; 356/625

(58) Field of Classification Search .......... 250/221, 250/239, 237 R, 227.21, 559.4, 559.12–559.15; 356/614, 627, 621, 638, 496, 511, 625; 408/6, 408/11, 16; 409/218, 134; 318/569, 560, 318/568.1, 568.12, 570, 573
See application file for complete search history.

(56) References Cited

U.S. PATENT DOCUMENTS

| | | | | |
|---|---|---|---|---|
| 3,498,721 A | * | 3/1970 | Thorndike ................. | 356/338 |
| 3,799,680 A | * | 3/1974 | Weisner ..................... | 356/225 |
| 4,502,823 A | | 3/1985 | Wronski et al. | |
| 4,672,201 A | * | 6/1987 | Welker ................... | 250/231.16 |
| 4,676,648 A | * | 6/1987 | Schulz et al. ............... | 356/638 |
| 5,138,150 A | * | 8/1992 | Duncan ..................... | 250/221 |
| 5,331,143 A | * | 7/1994 | Marom et al. ......... | 235/462.38 |
| 6,496,273 B1 | | 12/2002 | Stimpson et al. .......... | 356/614 |
| 6,648,476 B2 | | 11/2003 | Watanabe et al. | |

FOREIGN PATENT DOCUMENTS

| | | |
|---|---|---|
| CN | 1410830 A | 4/2003 |
| EP | 1 050 368 A1 * | 8/2000 |
| EP | 1 050 368 A | 11/2000 |
| FR | 2 787 589 A | 6/2000 |

* cited by examiner

*Primary Examiner*—Georgia Epps
*Assistant Examiner*—Pascal M Bui-Pho
(74) *Attorney, Agent, or Firm*—Oliff & Berridge, PLC

(57) ABSTRACT

The invention relates to a measuring device 5 of the type which detects the interruption of a beam of radiation (e.g. light 20) by an object (50 FIG. 1) in the beam. The device includes a light emitter 12 and a light detector 32 each enclosed in a housing 10 and 30. In order to accommodate different spacings between the housings different caps 14 having varying size apertures 11 are fittable to the housings. This allows varying amounts of light to be issued and/or detected. Other ways of adjusting the amount of light passing through the cap are disclosed.

14 Claims, 4 Drawing Sheets

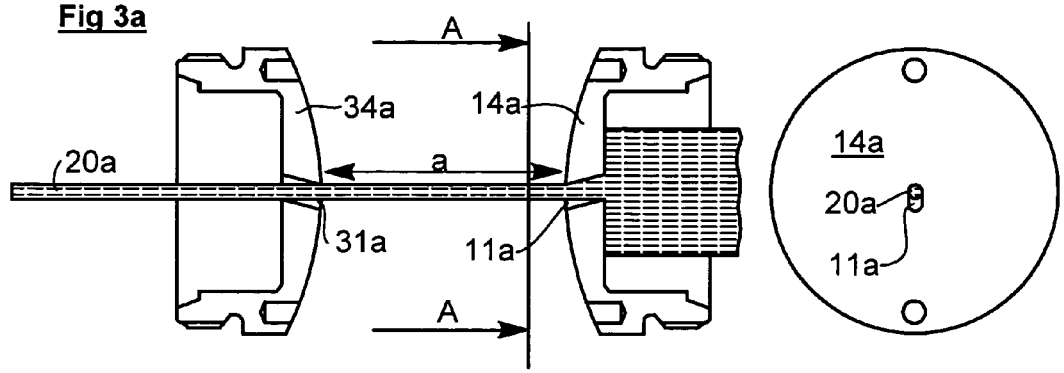
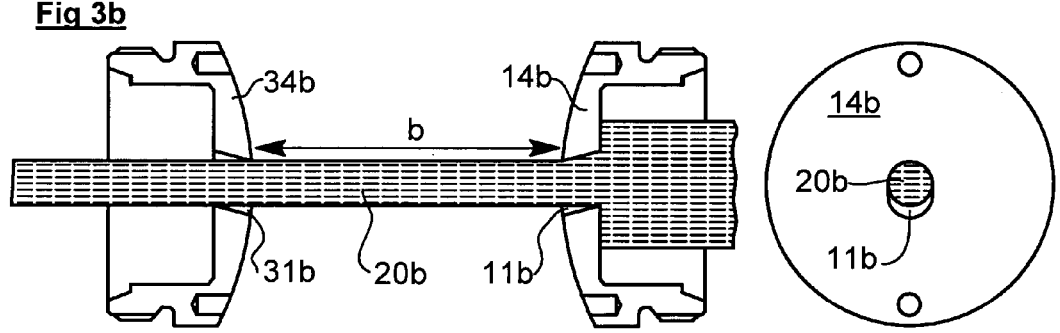
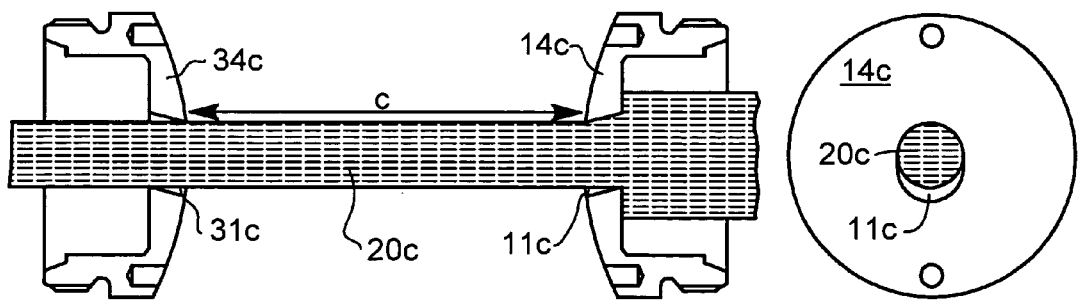

US 7,312,433 B2

MEASURING DEVICE AND METHOD FOR DETECTING OBJECTS INTERRUPTING A BEAM OF RADIATION

BACKGROUND OF THE INVENTION

1. Field of the Invention

This invention relates to the operation of a measuring device which utilises the breaking or restoring of a beam of radiation for detection of an object, particularly but not exclusively a measuring device for use as a cutting tool detector having a-radiation transmitter for transmitting a beam of radiation and a radiation detector spaced from the transmitter for detecting the beam of radiation.

2. Description of Related Art

Measuring devices of the type mentioned above are known. One such device is described in U.S. Pat. No. 6,496,273. The optical apparatus described is designed principally for use in detecting cutting tools on machine tools and is capable of very precise measurement.

In order to increase the versatility of the device shown in the above patent the light transmitter and light detector are required to be spaced at varying distances. Large tools require a greater distance between the transmitter and the detector than the distance required for a small tool so that they can fit in between the transmitter and the detector. A large machine tool may need a large distance between the transmitter and the detector so that a tool can be measured anywhere in the beam without it being necessary to traverse the tool long distances to a specific measuring location. Small machine tools do not have the space to include a lengthy measuring device which has a large distance between the transmitter and the detector.

Consequential adjustments in the gain of the amplifiers at the detector have to be made when the distance between the transmitter and the detector are varied. In practice gain is adjusted by removing a cover to obtain access to switches within the detector housing which are used to select the required gain based on the distance between the detector and the transmitter.

Problems occur when the user fails to replace the cover correctly or leaves contamination within the housing. Also the user can cause damage to the circuitry inside the housing or set the switches incorrectly. Other known commercially available systems use potentiometers instead of switches to adjust the gain, but such systems suffer the same drawbacks.

Thus a permanently sealed system would be advantageous but would not allow for conventional adjustment of detector amplifier gain.

SUMMARY OF THE INVENTION

The present invention provides a measuring device for detecting objects which interrupt a beam of radiation for use on a machine the device comprising:
  an emitter having a radiation emitter for emitting a beam of radiation;
  a detector having a radiation detector for detecting the radiation beam; and
  at least one of the emitter or the detector having a radiation restrictor which restricts the amount of radiation reaching the detector, the radiation restrictor including an adjustment for altering the amount of radiation reaching the detector.

Preferably the radiation restrictor includes a radiation transmissive area and the area is an aperture and the size of the aperture is alterable to form the said adjustment.

Preferably the radiation restrictor comprises a plurality of caps each fittable to the emitter and/or detector and each allowing different amounts of radiation through their respective radiation transmissive areas.

Preferably the amount of radiation is dependent on the distance of propagation of the said radiation.

Thus embodiments of the invention so characterised have the advantage that the emitter and detector can be spaced at any practical distance and caps can be fitted to one or both, which allow an amount of radiation (e.g. light) to pass which is appropriate to the distance between the emitter and detector.

Preferably the radiation is light.

Advantageously both the transmitter and the detector have housings which are fitted with a cap and each cap may be exchanged for another which allows more light to pass when the distance between the two housings is increased, or less light to pass when the housings are spaced closer together.

Preferably at least one of the housings has an internal cavity which is pressurised in use to a pressure which is greater than the pressure outside the housing and the aperture is in fluid communication with the cavity so that a fluid flow is induced through the aperture from the cavity to the outside of the housing.

Thus in embodiments of the invention the aperture has, in use, a flow of fluid issuing from it e.g. air, which keeps the aperture free from contaminants.

The invention extends to a method of adjusting the amount of radiation received within a device for detecting objects which interrupt a beam of radiation having a radiation beam emitter and a radiation beam detector, at least one of the emitter and detectors having a radiation restrictor which restricts the amount of radiation reaching the detector, the method comprising the step of adjusting the amount of radiation passable through the restrictor dependent on the distance of propagation of the radiation from the emitter to the detector.

Preferably the method includes the step of selecting an appropriate radiation restrictor in the form of a cap from a plurality of caps for allowing varying amounts of radiation to pass therethrough, the selected cap allowing an appropriate amount of light to be transmitted therethrough determined by the spacing between the emitter and detector.

BRIEF DESCRIPTION OF THE DRAWINGS

Various embodiments of the invention will now be described by way of example with reference to the drawings wherein:
FIGS. 3a,b and c show light restrictors for use with the measuring device of FIG. 2.

DETAILED DESCRIPTION OF THE PREFERRED EMBODIMENTS

Figure 1:
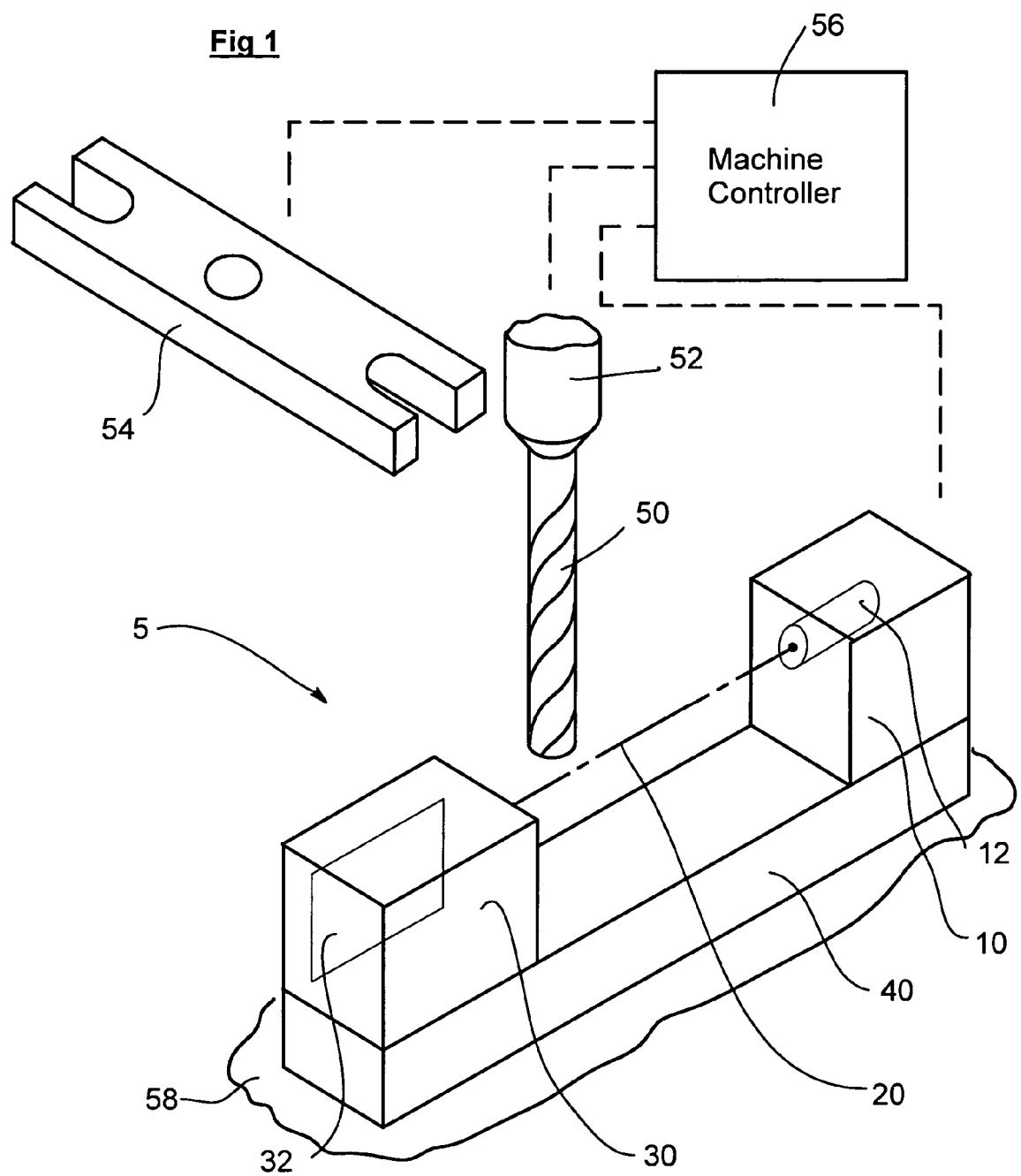
FIG. 1 shows a measuring device according to the invention mounted to a machine tool.

FIG. 1 shows a tool measuring device 5 suitable for use on a machine tool for example a computer controlled machine tool having a machine tool controller 56 and an automatic tool changer 54. In operation the device 5 emits a beam of light 20. A light emitting unit 12 emits the beam and light detecting unit 32 detects the beam. The two units are disposed within housings 10 and 30 respectively and are each mounted to a base 40.

In use, a tool for, example tool 50 is moved by its holder 52 toward (or away from) the beam 20 until it obscures (or restores) the beam. Measurement of the tool takes place at the instant the light beam is broken or restored. Conventionally a trigger signal is sent from the device to the machine controller 56 to indicate that the beam is broken or restored. The trigger signal is produced when a voltage at the detector is exceeded.

Figure 2:
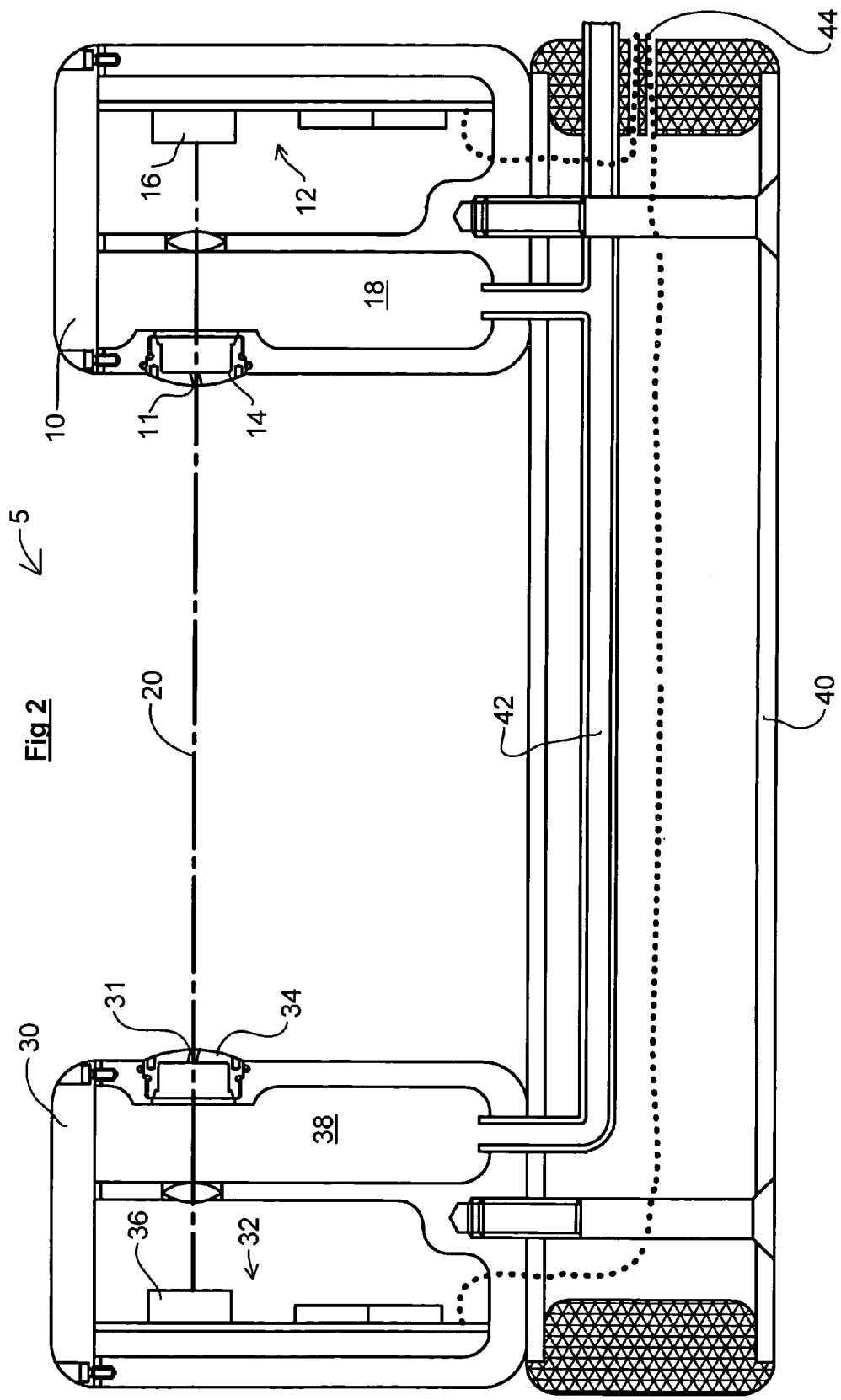
FIG. 2 shows a simplified section through the centre of a measuring device of the type shown in FIG. 1.

FIG. 2 shows a section through the centre of a measuring device of the type shown in FIG. 1. In this device the light emitting unit is sealed within its housing 10. The unit has a laser diode 16 which emits light beam 20. The width of the light beam 20 can be restricted by one of a number of light restrictor caps 14. The caps 14 are shown in more detail in FIGS. 3a,b and c, but in essence they have an aperture 11 for restricting the amount of light passing therethrough. The aperture 11 is open to an internal cavity 18 within the housing 10 which is pressurised by a pressurised air supply 42. Thus air bleeds constantly from the aperture 11 to the outside of the housing, so that the aperture does not become blocked by contamination.

The light beam may propagate to a further cap 34 mounted at the light detecting unit 32 housed in housing 30. A photodiode 36 detects the light beam when it is present. The amount of light and thus the photodiode voltage is controllable in this embodiment by the size of aperture in caps 14 and/or 34. An autogain circuit is provided to take account of variation in light levels so that fewer caps 14 have to be used.

Air bleeds also from an aperture 31 in cap 34 from pressurised cavity 38. Pressurised air, power and signals are supplied via supply 42 and cables 44 respectively within the base 40. Each of the housings 10 and 30 are in this instance secured to the base 40 also. However, the housings may be fixed directly to a machine surface for example the machine tool surface 58 shown in FIG. 1.

Now, for versatility the distance between the housings 10 and 30 can be varied. This can be done for example by re-securing the housings at different positions on the base 40 or by using different length bases 40. A few millimetres to 5 m or more separation is possible.

Changing the distance between the emitting unit 12 and the detecting unit 32 changes the amount of light incident at the detecting unit, possibly causing an excess or a deficiency of light at the detector. This problem is overcome by providing a range of light restricting caps shown in FIGS. 3a,b and c which alter the width of the beam detected. In addition a narrower beam is more useful for measuring smaller tools. A range of caps allows just one type of emitter and detector to be made and fitted with an appropriate cap. No adjustments to the circuits of the emitter and the detector need be made after manufacture.

FIGS. 3a,b and c show examples of restrictor caps 14 and 34. In FIG. 3a a small distance 'a' between the caps is present so a narrower beam 20a can be used because light losses in the beam path e.g. due to divergence of the beam are small.

FIG. 3b shows a larger distance 'b' between the caps 14b and 34b. As a larger distance 'b' results in losses so a wider beam of light 20b is required. This is achieved in this embodiment by providing larger apertures 11b and 31b.

Likewise FIG. 3c shows a yet larger distance 'c' and yet larger apertures 11c and 31c.

To the side of each FIG. 3a,b and c is shown a view of each cap in the direction of the axis of the respective beams 20a,b and c. The different sizes of apertures are apparent from these Figures.

It will be noted that the axis of each of the apertures is offset relative to the axis of the beam 20 (by an angle θ shown in FIG. 4) It is known that air passing in the same axis as the beam causes noise in the signal at the detector, whereas air passing through the aperture obliquely has far less effect.

Figure 4:
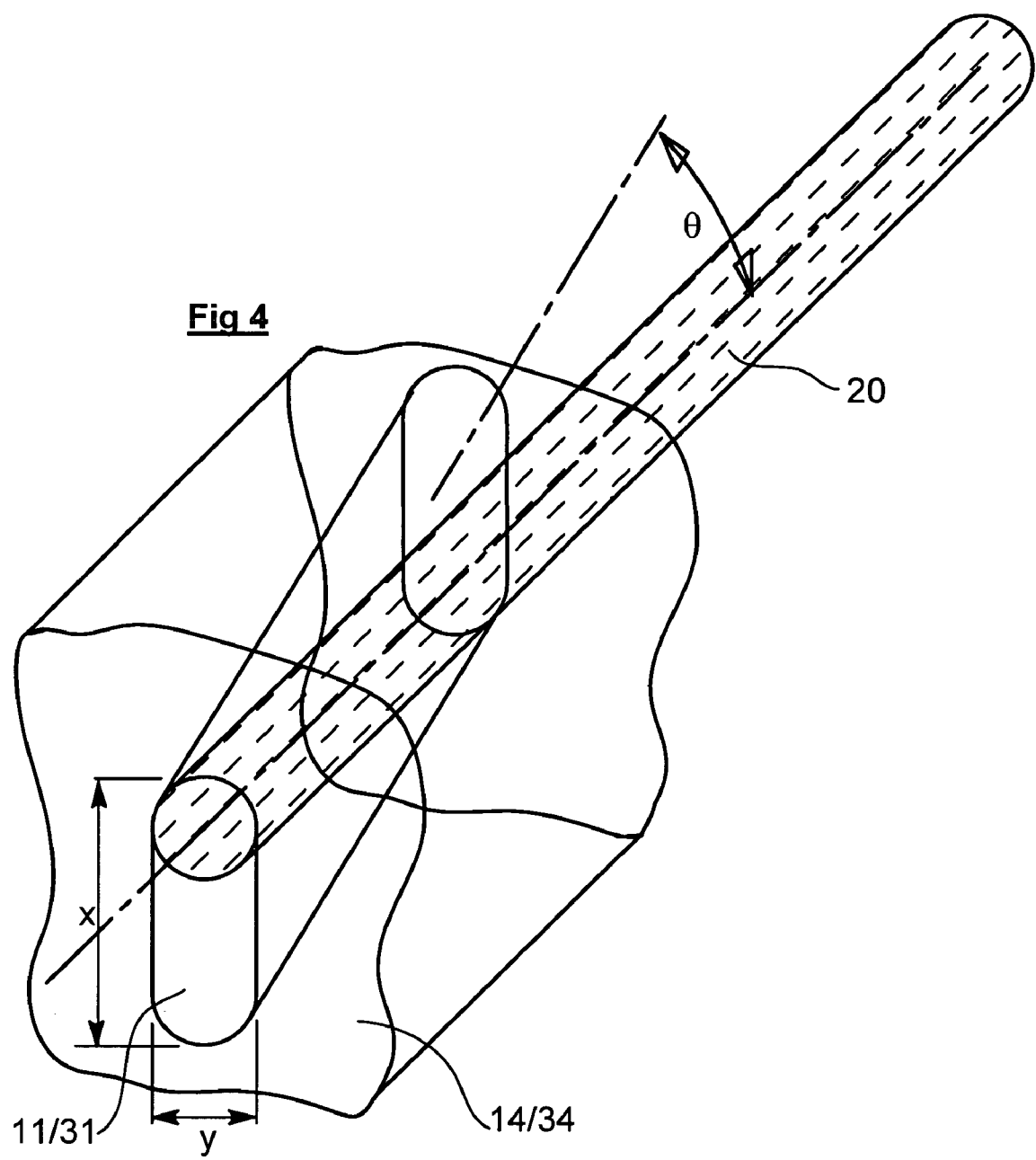
FIG. 4 shows in detail the aperture through the light restrictor shown in FIGS. 3a,b and c.

A typical aperture used is shown in FIG. 4. Until now a circular aperture has been used which has resulted in an eyelid shaped beam when viewed in the direction of the beam. The present invention provides an aperture or other light transmissive area having major and minor axes (for example x and y), where the major axis is longer than the minor axis, the aperture or other radiation transmissive area extending obliquely (e.g. by the angle θ) to the axis of radiation propagating through the aperture in use and the major axis extending also obliquely (e.g. at 90 degrees) to the axis of the radiation.

Preferably the angle θ is about 5-45 degrees, more preferably about 15-30 degrees, yet more preferably about 30 degrees.

Whilst the invention has been described and illustrated with reference to specific embodiments, variants of the invention will be readily apparent to the skilled addressee.

Whilst a tool detector for use on a machine tool has been described and illustrated the invention extends to a detector for any object. Whilst use with a light detecting beam has been shown it will be apparent that any beam of electromagnetic radiation could be utilised, e.g. infra-red radiation. Rather than an aperture in a series of caps, a variable size aperture could be used. Alternatively a light transmissive window could be used e.g. glass. The window might be different sizes in a series of caps and/or might have varying degrees of light transmission so that varying amounts of light can pass through each window. A variable size window could be used for example in the form of a light valve of variable size e.g. a liquid crystal display which has segments operable to increase or decrease the amount of light passing therethrough.

The embodiments show both housings having a cap 14 and 34. However an aperture or window as described above may be provided on only one of the housings so as to achieve the desired amount of light at the detector. The cap shown in FIGS. 3a,b and c might be replaced by an exchangeable planar sheet having an aperture or window therein.

Adjustment of the spacing between the housings 10 and 30 may be achieved by any suitable means for example by securing those housings at various positions on a base 40, by fixing at a desired spacing directly to a machine tool bed 58 or providing bases which have the desired spacing.

A wide range of spacings between the housing (a few millimetres to 5 m or more) can be achieved with only three different cap apertures as shown. Autogain circuitry is used to correct the operating voltage when different spacings are used with the same cap. This circuitry helps to increase the spacing range which can be accommodated by one cap. Fewer or more caps could be used. Fewer or more than three light restrictors could be employed also. Different size light transmissive areas can be used where two areas are employed.

The light emitting unit 10 and the light detecting unit may be disposed side by side, perhaps in the same housing. In this case the light detecting unit will be looking for light or other radiation reflected off an object as it passes the beam emitted by the light emitting unit 10. Thus, it may be necessary to alter the quantity of radiation in the beam dependent on the approximate distance between the object and the emitter/detector 10/30.

So, it is the distance of propagation of the radiation which defines the required quantity of radiation of the beam, not solely the distance between the two housings of the emitter and detector units.

The invention claimed is:

1. A cutting tool measuring device for use on a machine tool, the device comprising:
   an emitter having a radiation emitter for emitting a beam of radiation;
   a detector having a radiation detector for detecting said beam of radiation; and
   a tool measuring apparatus for generating a trigger signal when said beam of radiation is at least one of broken and restored by a cutting tool;
   wherein at least one of the emitter and the detector comprise a radiation restrictor which restricts the amount of radiation reaching the radiation detector, the radiation restrictor including an adjustment for selecting the amount of radiation reaching the radiation detector,
   wherein the radiation restrictor has a plurality of caps, each cap being fittable to at least one of the emitter and the detector, wherein each cap, when fitted to said at least one of the emitter and the detector, allows a different amount of radiation to pass to the radiation detector, and
   wherein said beam of radiation has a substantially circular cross-section after being acted upon by said radiation restrictor.

2. A device as claimed in claim 1 wherein at least one of the emitter and the detector have one of said caps attached thereto, the amount of radiation passable through said cap being selected according to the distance of propagation of the beam of radiation between the emitter and the detector.

3. A device as claimed in claim 1 wherein the radiation restrictor comprises a filter which has varying degrees of radiation transmission.

4. A device as claimed in claim 1 wherein each of said plurality of caps includes a radiation transmissive area having an aperture.

5. A device as claimed in claim 4 wherein the aperture has two axes one of which is of greater magnitude than the other and the aperture extends generally in a different direction to the propagation of the radiation of the beam.

6. A device according to claim 4 wherein the emitter and detector are housed in at least one housing and said at least one housing has an internal cavity which is pressurized in use to a pressure which is greater than the pressure outside the housing and the aperture is in fluid communication with the cavity so that a fluid flow is induced through the aperture from the cavity to the outside of the housing.

7. A computer controlled machine tool comprising a device according to claim 1 and a tool holder for holding a cutting tool.

8. A machine tool according to claim 7 comprising a machine tool controller.

9. A machine tool according to claim 8 wherein the machine tool controller is arranged to receive said trigger signal.

10. A method of operating a tool measuring device, the tool measuring device comprising an emitter having a radiation emitter for emitting a beam of radiation, a detector having a radiation detector for detecting said beam of radiation and tool measuring apparatus for generating a trigger signal when said beam of radiation is at least one of broken and restored by an associated tool,
    at least one of the emitter and the detector comprising a radiation restrictor which restricts the amount of radiation reaching the radiation detector, wherein said beam of radiation has a substantially circular cross-section after being acted upon by said radiation restrictor, the method comprising the steps of:
    (i) locating the emitter a first distance from the detector; and
    (ii) selecting the amount of radiation passable through the radiation restrictor dependent on said first distance,
    wherein the radiation restrictor has a plurality of caps that each allow varying amounts of radiation to pass therethrough, wherein step (ii) includes selecting an appropriate cap from said plurality of caps.

11. A method according to claim 10 wherein the beam of radiation is light.

12. A method according to claim 10 wherein each of the plurality of caps has an aperture which is different in size to allow the said selected amount of radiation therethrough.

13. A plurality of caps, each cap allowing different amounts of radiation to pass said cap in use,
    wherein each cap is fittable to a tool measuring device for detecting an object in a beam of the radiation passable through the cap, and each cap comprises an aperture for allowing said different amounts of radiation to pass, said aperture extending obliquely to the axis of propagation of the beam of radiation passable through the cap.

14. A plurality of caps according to claim 13, wherein each aperture has a substantially oval cross-section.

* * * * *